US00RE35946E

United States Patent [19]

Ainslie et al.

[11] E Patent Number: Re. 35,946

[45] Reissued Date of Patent: Nov. 3, 1998

[54] OPTICAL FIBRE AMPLIFIER WITH FLUORESCENT ADDITIVE AND METHOD OF AMPLIFYING SIGNALS USING SAME

[75] Inventors: Benjamin J. Ainslie; Susan P. Craig; Jonathan R. Armitage, all of Ipswich, England

[73] Assignee: British Telecommunications plc, London, England

[21] Appl. No.: 879,843

[22] Filed: May 6, 1992

Related U.S. Patent Documents

Reissue of:

[64] Patent No.: 4,923,279
Issued: May 8, 1990
Appl. No.: 257,101
Filed: Oct. 13, 1988

[30] Foreign Application Priority Data

Oct. 22, 1987 [GB] United Kingdom ..... 8724736

[51] Int. Cl.[6] ..... G02B 6/02; H01S 3/00; H01S 3/30

[52] U.S. Cl. ..... 385/127; 385/123; 385/126; 385/142; 359/341; 359/343; 359/345; 372/6; 372/40; 372/42

[58] Field of Search ..... 372/6, 40, 43; 385/12, 122, 123, 126, 127, 142, 144, 147, 900; 359/333, 341, 343, 345; 65/376, 385, 390

[56] References Cited

U.S. PATENT DOCUMENTS

| | | | |
|---|---|---|---|
| 3,254,031 | 5/1966 | De Paolis et al. | 252/301.14 R |
| 3,503,764 | 3/1970 | Young | 501/51 |
| 3,571,737 | 3/1971 | Miller | 330/4.3 |
| 3,599,106 | 8/1971 | Suitzer | 330/4.3 |
| 3,615,766 | 10/1971 | Piesslinger et al. | 501/37 |
| 3,636,473 | 1/1972 | Young | 372/33 |
| 3,785,834 | 1/1974 | Rapp | 501/2 |
| 3,808,549 | 4/1974 | Maurer | 372/6 |
| 3,864,113 | 2/1975 | Dumbaugh | 65/60 |
| 3,894,857 | 7/1975 | Uchida et al. | 65/3.14 |
| 3,938,974 | 2/1976 | Macedo et al. | 65/3.12 |
| 3,971,645 | 7/1976 | Bachmann et al. | 65/3.11 |
| 4,040,890 | 8/1977 | Burrus, Jr. et al. | 372/6 |

(List continued on next page.)

FOREIGN PATENT DOCUMENTS

| | | | |
|---|---|---|---|
| 2238679 | 2/1975 | France . | |
| 2339266 | 8/1977 | France . | |
| 2417963 | 8/1975 | Germany . | |
| 61-151034 | 7/1986 | Japan | 385/123 X |
| 62-111208 | 5/1987 | Japan | 385/123 X |
| 63-184386 | 7/1988 | Japan | 385/123 X |
| 2140169 | 11/1984 | United Kingdom . | |
| 8607348 | 12/1986 | WIPO . | |
| 8701110 | 2/1987 | WIPO . | |

OTHER PUBLICATIONS

Electronics, vol. 43, No. 20, 28th Sep. 1979, pp. 129–130, New York, USA "Glass Laser Fibers Help Transmit and Amplify Beams".

Optical Fiber Communication Conference, Technical Digest, 24th–26th Feb. 1986 Atlanta, Ga., Paper TUL15, pp. 62–64, IEEE, New York, USA; R.J. Mears et al.: "Rare–Earth–Doped Fiber Lasers".

Applied Physics Letters, vol. 23, No. 7, 1st Oct. 1973, pp. 388–389, American Institute of Physics: J. Stone et al.: "Neodymium–Doped Silica Lasers in End–Pumped Fiber Geometry".

(List continued on next page.)

*Primary Examiner*—Brian Healy
*Attorney, Agent, or Firm*—Nixon & Vanderhye, P.C.

[57] ABSTRACT

An optical fibre for use in fibre lasers has the lasing additive eg $Er^{3+}$, concentrated in center of the core. Preferably the core has an inner region which contains the additive and an outer region which is dopant free. The concentration of the dopant reduces the pump threshold for a laser and improves the gain performance for a given pump power. The fibre is conveniently made in MCVD. The use of $Al_2O_3$ in the inner zone appears to reduce loss of dopant during tube collapse.

25 Claims, 1 Drawing Sheet

U.S. PATENT DOCUMENTS

| | | | |
|---|---|---|---|
| 4,149,772 | 4/1979 | Iyengar et al. | 385/126 X |
| 4,283,213 | 8/1981 | Akers et al. | 65/3.11 |
| 4,419,115 | 12/1983 | Johnson et al. | 65/3.12 |
| 4,597,787 | 7/1986 | Jacobson | 65/3.12 |
| 4,618,211 | 10/1986 | Fleury, V | 385/123 X |
| 4,637,025 | 1/1987 | Snitzer et al. | 372/1 |
| 4,666,486 | 5/1987 | Hutta | 65/3.11 |
| 4,715,679 | 12/1987 | Bhagavatula | 385/126 X |
| 4,726,652 | 2/1988 | Tajima et al. | 385/121 |
| 4,780,877 | 10/1988 | Snitzer | 372/6 |

OTHER PUBLICATIONS

Journal of The American Ceramic Society, vol. 56, No. 2, Feb. '73, pp. 68–72 E.A. Weaver et al.: "Lasing in a Phase–Separated Glass".

Journal of the Electrochemical Society, vol. 122, No. 1, Jan. 75, pp. 101–107, F. Auzel et al., "Rare Earth Doped Vitroceramics: New, Efficient, Blue and Green Emitting Materials for Infrared Up–Conclusions".

Japanese Journal of Applied Physics, vol. 23, No. 6, pt. 3, Jun. 1984, pp. L409–L411, Tokyo, JP: H. Namikawa et al., "Preparation of Nd–Doped $SiO_2$ Glasses by Axial Injection Plasma Torch CVD and Their Fluorescence Properties."

Electronics Letters, Aug. 15, 1985, vol. 21, No. 17, "Fabrication of Low–Loss Optical Fibres Containing Rare—Earth Ions", pp. 737–738, Poole et al.

Electronics Letters, vol. 22, No. 8, Apr. 10, 1986, pp. 411–412, Hitchin, Herts, GB:S. Patela et al., "Non–Linear Prism Coupling in Wave Guiding Structures Deposits on to Semiconductor–Doped Glass."

Soviet Journal of Quantum Electronics, vol. 12, No. 10, Oct. 1982, pp. 1343–1345, N.Y. V. G. Abashkin et al., "Non–Linear Absorption of Light in Glassy Arsenic Surlfide Fibers in the Energy Range Hnu Less Than Eg".

Soviet Journal of Quantum Electronics, vol. 12, No. 12, Dec. 1982, pp. 1571–1574, N.Y. V.G. Abashkin et al.: "Glassy Chalcogenide Semiconductor Fibers."

Journal of the Optical Society of America, vol. 73, No. 5, May 1983, pp. 647–653, N.Y., R.R. Jain et al., "Degenerate Four–Wave Mixing in Semiconductor–Doped Glasses".—Abstract.

Digest of Technical Papers, Conference on Laser and Electro Optics, 21–24 May, 85, p. 290 OSA/IEEE, Baltimore, Md., U.S.A.: S.S. Yau et al., "Ultrafast Optical Signal Processing Using Semiconductor–Doped Glasses".

"Optical Fibres with an $Al_2O_3$–Doped Silicate Core Composition", *Electronics Letters,* vol. 19, No. 7, 31 Mar. 1983, pp. 261–262.

"Neodymium–doped Silica Lasers in End–Pumped Fiber Geometry", *Appl. Phys. Lett.,* vol. 23, No. 7, 1 Oct. 1973, pp. 388–389.

Patent Abstracts of Japan, vol. 11, No. 328 (P–629) 27 Oct. 1987, Shoichi et al.

JP–A–62111208 (N.T.T) 22 May 1987.

"Fabrication and Characterization of Low–Loss Optical Fibers Containing Rare–Earth Ions", *Journal of Lightwave Technology,* vol. LT–4, No. 7, Jul. 1986, pp. 870–875.

"Aluminum or Phosphorus Co–Doping Effects on the Fluorescence and Structural Properties of Neodymium–Doped Silica Glass", *J. Appl. Phys.,* 59(10), 15 May 1986, pp. 3430–3436.

Mears, R.J., et al., "High–gain rate–earth–doped Fiber Amplifier at 1.54μm", Optical Fiber Communication Conference, Sixth International Conference on Integrated Optics and Optical Fiber Communication Technical Digest, Jan. 19–22, 1987.

Poole, Simon B., et al., "Fabrication and Characterization of Low–Loss Optical Fibers Containing Rare–Earth Ions", *Journal of Lightwave Technology,* vol. LT. 4, No. 7, Jul. 1986.

Electronics Letters, vol. 19, pp. 261–262.

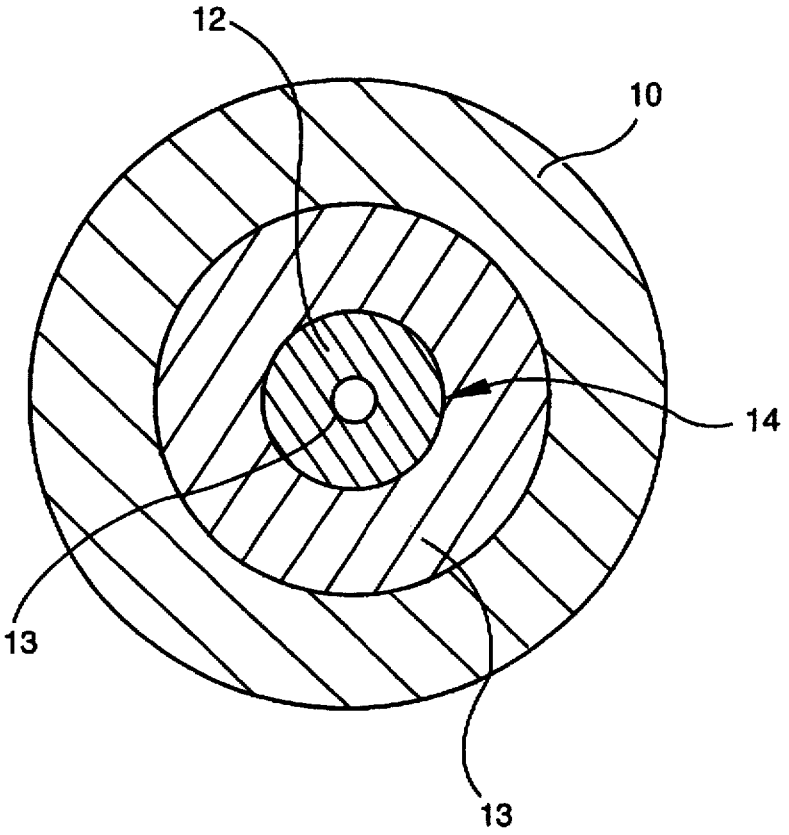
12
10
14
13
13

OPTICAL FIBRE AMPLIFIER WITH FLUORESCENT ADDITIVE AND METHOD OF AMPLIFYING SIGNALS USING SAME

Matter enclosed in heavy brackets [ ] appears in the original patent but forms no part of this reissue specification; matter printed in italics indicates the additions made by reissue.

FIELD OF THE INVENTION

This invention relates to optical fibre with a fluorescent additive and in particular to fibre which is suitable for the construction of fibre lasers.

BACKGROUND AND SUMMARY OF THE INVENTION

There is currently much technical interest in a wide range of devices in which radiation at wave lengths of 0.3 μm to 4 μm is generated in the core of an optical fibre. In these devices the fibre contains a fluorescent additive which interacts with excitation radiation, usually identified as the "pump radiation", to produce the desired output. The devices take many forms, e.g. broadband sources, super luminescent sources and temperature sensors, but devices which display laser activity are particularly important, especially in telecommunications. It should be realised that telecommunications uses laser activity in two distinct manners namely optical oscillators and optical amplifiers. However the same doped glass fibres are equally suitable for a plurality of such applications (and often for all such applications).

Stone and Nurrus in "Applied Physics Letters" (Volume 23, No. 7, 1 October 1973 at pages 388 and 389) disclose lasers made of neodymium doped silica with end-pumped fibre geometry. One of their systems has an active core of fused $SiO_2$ and $Nd_2O_3$ enclosed in a thin passive sleeve of $SiO_2$ and $Nb_2O_5$ all enclosed in a fused jacket of $SiO_2$. The diameter of the active core was about 800 to 15 μm and the length of the samples was 1 cm. The function of the thin passive sleeve is to increase the guidance of the core and hence pump efficiency.

U.S. Pat. No. 3 808 549 describes an optical wave-guide light source having an active core surrounded by an inner cladding layer and an outer cladding layer. The refractive index of the outer cladding is lower than the refractive index of the inner cladding which is lower than the refractive index of the core. Pump radiation is launched into the inner cladding layer to which it is confined by the outer cladding. The pump radiation makes many passes through the core whereby its absorption by the core is increased. The signal is generated within the core.

It has long been recognised that the rare earth elements, e.g. Nd, Er, and Yb, display fluorescent properties which make them suitable for use as fluorescent additives in optical fibre. Their fluorescent properties make them particularly suitable for use in the laser devices mentioned above. The operation of a fluorescent device clearly depends on absorption of the pump photons in order to raise ions (or other fundamental particles) of dopant to an excited state for subsequent emission on a different transition. In a laser device, this emission is stimulated by the presence of a signal photon and, therefore, the operation of a laser device also depends on the interaction of radiation at signal wave length. It is an object of this invention to make efficient use of pump power launched into optical fibre. In the case of optical amplifiers this means achieving high gain for small launched pump powers whereas for optical oscillators it implies a low lasing threshold.

Fibre according the invention has a fluorescent additive unevenly distributed over the cross section of the core and having a higher concentration of the additive at the centre of the core than at the core/cladding boundary. The highest concentrations or additive should ideally be located in those regions of the fibre where, during pumping, the highest intensity of pump radiation is to be expected. Lower or zero concentrations of the additive should be located where only low pump intensities are to be expected.

In most pumping schemes the highest intensity of the pump radiation will be located at the centre of the core and it is appropriate to provide the highest dopant concentration at the centre of the core with zero concentration at its periphery. Preferably the core comprises two zones, namely an inner zone surrounded by an outer zone wherein the inner zone contains the dopant and the outer zone contains substantially no dopant. Suitably the inner zone constitutes less than a quarter, e.g. 5 to 15%, of the cross sectional area of the core.

The fibre may be implemented in any glass system which is compatible with the fluorescent dopants. Thus, for example, the fibre may be implemented in conventional silicate, phosphate and fluoride systems, eg. fluorides of Zr, Ba, La, Al, Na and Hf or in silica systems, eg. $SiO_2$ with additives such as $GeO_2$ to adjust the refractive index in the core.

In a specific embodiment silica fibre has:

(a) a cladding formed of $SiO_2$ with $P_2O_5$ to reduce the melting point, and F to offset the increase in refractive index, (b) an outer core region formed of $SiO_2$ with $GeO_2$ to increased the refractive index and $P_2O_5$ to reduce the melting point; and (c) an inner core region formed of $SiO_2$ with $Al_2O_3$ to increase the refractive index, $P_2O_5$ to decrease the melting point and prevent devitrification and a fluorescent dopant to interact with the pump radiation.

The dimensions of the fibre are preferably such that it is single mode at signal wave length. This implies that it may be able to support several, e.g. up to 4 or 5, modes at pump frequency. The fluorescent dopants of major interest include the rare earth metals. Of these the most important are Er (which lases by the three level mechanism) and Nd (which lases by the 3 and four level mechanism)

One method of making silica fibre according to the invention utilises the modified chemical vapour deposition process usually identified as MCVD. MCVD is sometimes known as the inside deposition process because the glasses which eventually form the operative parts of the fibre are produced by converting the equivalent chlorides into the desired oxides which are deposited, layer by layer, on the inner surface of a substrate tube. Usually a total of 10 to 30 layers are deposited. As initially deposited the glass is porous but the porous material is immediately fused to give a solid layer upon which subsequent layers are deposited. When all the layers have been deposited the tube is collapsed to a rod which is drawn into fibre.

To make fibre according to the invention this procedure is followed for the cladding and the outer core. The precursor of the inner core is deposited but left in the porous state. Dopants, including the fluorescent additive, are introduced as solution into the porous layer. After solvent removal and conversion to oxides as necessary, the porous layer is consolidated and the tubular configuration is collaped into a rod which is then drawn into fibre.

It will be appreciated that this, i.e. soaking a solution into a porous layer, is one of many known techniques of introducing dopants into optical fibre. It has been adapted, in accordance with the invention, to provide a small, doped centre region in a larger core. One difficulty inherent in MCVD is that there is a tendency to lose dopant by evaporation from the exposed inner surface. This is not acceptable since the invention requires a high concentration of dopant at the axis. The depleted zone can be removed, e.g. by etching, just before final collapse. Although there appears to be a risk that further loses could occur during the final stage of the collapse, this does not happen to any noticeable extent because:

(1) The exposed surface is so small that the rate of loss is minimal.

(2) The final stage only takes a time which is too brief for noticeable loss to occur.

However we have most surprisingly discovered that, when aluminium is used to adjust the refactive index of the core, the loses of fluorescent dopant are not noticeable. The aluminium can be introduced at the same time as the fluorescent dopant, e.g. as $Al(NO_3)_3$ in alcoholic solution. During heating the $Al(NO_3)_3$ is converted to $Al_2O_3$.

The fibre according to the invention can be used to make conventional fibre devices which include a pump for providing excitation radiation for the fluorescent additive.

BRIEF DESCRIPTION OF THE DRAWINGS

The invention will now be described by way of example with reference to the accompanying drawing which is a cross section through a fibre according to the invention;

DETAILED DESCRIPTION

The drawing shows a fibre according to the invention prepared by the MCVD process. This fibre has a residual layer 10 which is the residue of the substrate tube used in the MCVD process. The layer 10 has no optical function. The fibre also has a conventional cladding 11, a core which is generally indicated by the numeral 14, having an (undoped) outer region 12 an inner region 13 which contains a fluorescent dopant, e.g. Er, at a concentration of 0.001–10.0 wt % Er.

Fibre as described above was prepared by a substantially conventional MCVD process in which a substate tube was rotated in a glass blowing lathe while a reactant gas was passed through its bore. In the course of the preparation three different reactant mixtures, to be specified below, were used.

A short segment of tube, about 2 cm long, was heated to reaction temperature by a travelling flame. In this segment chlorides were converted into oxides which deposited as a porous ring downstream of the flame. As the flame traversed, in the case of cladding and outer core, the deposit was fused to form a thin layer on the inner surface of the substrate tube. In the case of inner core, a lower temperature was used so that the deposit did not fuse whereby it remained porous.

The reaction mixture used to form the cladding precursor was obtained by bubbling:

700 ml/min of $O_2$ through $SiCl_4$, 90 ml/min of $O_2$ through $POCl_3$.

The mixture of these two gas streams was diluted with 1.5 liter/min $O_2$ and 1.0 liter/min He. In addition, 6 ml/min of $CCl_2F_2$ were included in the mixture. The maximum temperature in the hot zone was 1600° C. and the flame travelled at 18 cm/min.

Five cladding layers were thus deposited on a substrate tube of 10 mm inner diameter. These fused together to form a cladding layer of $SiO_2$ doped with $P_2O_5$ and fluorine.

(The $P_2O_5$, which is derived from the $POCl_3$, is incorporated to reduce the melting point of the $SiO_2$ which makes the fusion easier. The $P_2O_5$ slightly increases the refractive index of the silica but the fluorine slightly reduces the refractive index. By balancing the two concentrations the refractive index of the five cladding layers is sunstantially equal to that of pure silica. Thus the $POCl_3$ and $CCl_2F_2$ are processing aids which have little or no effect on the performance of the final product which, therefore, consists essentially of $SiO_2$).

Eight layers to form the outer core were deposited next. The reaction mixture used for each layer was obtained by bubbling:

200 ml/min at $O_2$ through $SiCl_4$ 200 ml/min of $O_2$ through $GeCl_4$ 10 ml/min of $O_2$ through $POCl_3$.

The mixture of these three gas streams was diluted with 1.5 liters/min of $O_2$. These eight layers were fused together at 1500° C. and the flame travelled at 16 cm/min. This formed the outer core region which consisted essentially of $SiO_2$ doped with $GeO_2$ to increase the refractive index and $P_2P_5$ to facilitate processing by lowering the melting point of the glass.

The precursor at the inner core was deposited in two porous layers. The reaction mixture was obtained by bubbling:

200 ml/min of $O_2$ through $SiCl_4$ 10 ml/min of $O_2$ through $POCl_3$ and diluting with 1.5 liters/min of $O_2$. The torch traverse rate was 17 cm/min and the maximum temperature was at 1300° C. (which is too low to fuse the deposit).

(Note. In all bubbling operations the liquid was at 25° C.) At this point the tube was removed from the lathe and dopants were introduced into the porous layers by immersion for 1 hour in an ethanolic solution of 1M $Al(NO_3)_3$ 0.08M $ErCl_3$.

After soaking, the tube was drained, blown dry with $N_2$ for one hour, and returned to the lathe where it was heated at about 800°–1000° C. for a few minutes. This completed solvent evaporation. The temperature was raised to about 1900° C. for collapse to a rod. This also ensured conversion of $Al(NO_3)_3$ to $Al_2O_3$ and $ErCl_3$ to $Er_2O_3$. The tube was flushed with $O_2$/He mixture during all of these stages (about 10% (volume) of $Cl_2$ could be introduced into the $O_2$/He mix if a very dry product were required.)

The resulting perform had a core about 2 mm diameter. Analysis (using disperive X-ray techniques) confirmed that Al and $Er^{3+}$ were confined to the central region. The reason for choosing a large core will be briefly explained.

The ultimate objective is a fibre having the dopant, $Er^{3+}$, contained in a very small inner core, e.g. with a diameter of 1 to 3 μm. It was decided to achieve this by means of a fat outer core (8 layers), a thin inner core (2 layers) and a high overall draw ratio, i.e. length extension of about $1:10^5$.

The fatness of the preform made it difficult to handle and it was drawn in two stages. First the external diameter was reduced from 7.0 mm to 3.2 mm, i.e. an axial draw of 1:4.8. The drawn rod was sleeved with a silica tube and then drawn $1:2.5\times10^4$ to give the product fibre.

(There is a well known problem that dopants are lost during collapse from the inner layers of the preform. This results in a thin axial depletion zone. In the process above described $Al_2O_3$ was present and in the presence of this compound no loss of $Er^3$+ occurred.) The product fibre had the following measurements.

| Cladding (11) | |
|---|---|
| OD | 7 μm |
| ID | 4 μm |
| RI | matched to silica |
| **Core** | **Outer Region 12** |
| OD | 4 μm |
| ID | 1.5 μm |
| $Er^3$+ | NONE |
| **Core** | **Inner Region 13** |
| Diameter | 1.5 μm |
| $Er^3$+ | 1 wt % |

| General Properties | | |
|---|---|---|
| OD | | 125 μm |
| $LP_{11}$ | Cut Off | 790 nm |
| RI step | | 0.01 |

"RI step" denotes the difference between the RI of the core and the RI of the cladding.

A possible theory of the operation of this fibre will now be briefly indicated.

The considerations set out above are particularly pertinant to dopants which lase as a three level system. The three levels are:

(a) The ground state, (b) the pump level, (c) upper laser level, (also known as the metastable level).

The absorption of pump photon by a ground state ion transfers that ion to the upper pump level from where it decays non-radiatively to the upper laser level. That ion can then return to the ground state via the lasing transition, i.e. gives out a signal photon. In order to achieve the population inversion essential for laser operation it is necessary to pump more than half the dopant ions from the ground state to the upper laser level. Thus it is important to note that, at a particular point in space, if fewer than half the ions have been pumped to the upper laser level then the signal beam will be attenuated at that point.

It is therefore extremely desirable to preferentially locate the fluoresence additive where the pump intensity is highest, i.e. on the axis and to prevent there being any dopant ions in the regions where the pump intensity is lower.

The signal beam, which being single mode also has its maximum intensity on the axis, overlaps well with the excited dopant ions and thus effectively depopulates the upper laser level.

In order to illustrate the benefit of the invention comparative measurements were made on two very similar fibres both of which used $Er^{3+}$ ions as the flurescent species. The fibre, identified as "A", had the $Er^{3+}$ ions located in a centre core Region 13 as shown in FIG. 1. The comparative fibre, identified as "X", had the more standard $Er^{3+}$ distribution, i.e. uniformly distributed over the whole of the core. Details of both fibres are given in Table 1.

| Diameters (μm) | A | X |
|---|---|---|
| Total | 125 | 125 |
| To Cladding (11) | 6.0 | 6.0 |
| To Core (12) | 3.5 | 3.5 |
| Inner Region (13) | 1.0 | NONE |
| RI Step | 0.0100 ± 0.005 | 0.0095 ± 0.005 |
| $LP_{11}$ Mode cut off (nm) | 790 | 790 |

In the case of fibre A the dopant was contained only in the inner region 13. Based on this region alone the concentration of $Er^{3+}$ was 0.45% wt or 0.037% wt based on the total core 14. For fibre X the concentration of $Er^{3+}$ was 0.05% wt based on the total core 14.

The performances of the two fibres were compared by measuring the "transparency power" of each.

To measure the transparency power a short length of fibre is used so that pump power does not change significantly along the length. The test comprises launching the signal at wave length 1.54 μm and pump at wave length 528.7 nm into the opposite ends of the fibre. The input and output powers of the signal are measured for several values of pump power. There exists a specific pump power at which the signal is neither amplified or attenuated and this power is known as the "transparency power". This name is considered appropriate because, at this pump power, the fibre simulates a perfectly transparent window. At higher pump powers than the transparency power, the fibre amplifies the signal beam whereas at lower pump powers the fibre attenuates the signal beam. The transparency power is a direct measure of the performance of the invention and the lower the transparency power the better the performance. The transparency powers of the two fibres was

| | |
|---|---|
| Fibre A | 0.8 mW |
| Fibre X | 1.4 mW |
| Ratio | 1:1.75 |

Thus the fibre according to the invention gave gain at much lower pump power than the comparative fibre.

We claim:

1. An optical fibre suitable for forming fluorescent devices, said optical fibre having a cladding, and a core having a longitudinal core axis, said core containing a fluorescent dopant, characterized in that the concentration of the dopant is substantially greater on the core axis than at the interface between the gore and the cladding.

2. A fibre according to claim 1 wherein the core comprises an inner region and an outer region surrounding the inner region wherein substantially all of the dopant is contained in the inner region.

3. A fibre according to claim 2, wherein the inner region constitutes not more than a quarter of the total cross sectional area of the core.

4. A fibre according to claim 3, wherein the inner region constitutes 5% to 15% of the cross sectional area of the core.

5. A fibre according to claim 2, wherein the dopant is substantially uniformly distributed in the inner region of the core.

6. A fibre according to claim 1, which is monomode et signal wave length.

7. A fibre according to claim 1, wherein the dopant is capable of lasing transition.

8. A fibre according to claim 7, wherein the dopant is a three level lasing element.

9. A fibre according to claim 1, wherein the dopant is a rare earth element.

10. A fibre according to claim 9, wherein the dopant is selected from Er, Nd, Pr, Ho, Yb and Tm.

11. A fibre according to claim 10, wherein the dopant is $Er^{3+}$.

12. An optical fibre which comprises (a) a cladding region formed of a first glass composition having a first refractive index;

(b) an outer core region surrounded by said cladding region and formed of a second glass composition having a second refractive index said second refractive index being higher than said first refractive index;

(c) an inner core region surrounded by said outer core region and formed of a third glass composition having a refractive index substantially equal to said second refractive index wherein said third glass composition contains a dopant which is capable of undergoing lasing transitions wherein the concentration of said dopant is 0.001 to 10% by weight based on the total third glass composition.

13. An optical fibre which comprises (a) a cladding region formed of a first glass composition having a first refractive index;

(b) an outer core region surrounded by said cladding region and formed of a second glass composition having a second refractive index said second refractive index being higher than said first refractive index;

(c) an inner core region surrounded by said outer core region and formed of a third glass composition having a refractive index substantially equal to said second refractive index wherein said third glass composition contains a dopant which provides a rare earth element in a form capable of undergoing lasing transitions wherein the concentration of said dopant is such as to provide 0.001 to 10% by weight of said rare earth element based on the total third glass composition.

14. An optical fibre which comprises (a) a cladding region formed of a first glass composition having a first refractive index;

(b) an outer core region surrounded by said cladding region and formed of a second glass composition having a second refractive index said second refractive index being higher than said first refractive index;

(c) an inner core region surrounded by said outer core region and formed of a third glass composition having a refractive index substantially equal to said second refractive index wherein said third glass composition contains a dopant which provides an element selected from Er, Nd, Pr, Ho, Yb and Tm in a form capable of undergoing lasing transitions wherein the concentration of said dopant is such as to provide 0.001 to 10% by weight of said element based on the total third glass composition.

15. An optical fibre which comprises (a) a cladding region consisting essentially of $SiO_2$;

(b) an outer core region surrounded by said cladding region and consisting essentially of $SiO_2$ and an additive which increases the refractive index of the $SiO_2$;

(c) an inner core region surrounded by said outer core region and consisting essentially of $SiO_2$, an additive which increases the refractive index of the $SiO_2$ so that the refractive indices of the inner and outer core regions are substantially equal, and a dopant which is capable of undergoing lasing transitions wherein the mole ratio of Si to dopant is between $1:10^{-4}$ and 1:10.

16. An optical fibre which comprises (a) a cladding region consisting essentially of $SiO_2$;

(b) an outer core region surrounded by said cladding region and having a refractive index greater than said cladding region, said outer core region consisting essentially of $SiO_2$ and $GeO_2$;

(c) an inner core region surrounded by said outer core region and having a refractive index substantially equal to said outer core region, said inner core region consisting essentially of $SiO_2$, $Al_2O_3$ and a dopant capable of undergoing lasing transitions.

17. An optical fibre according to claim 16, wherein the mole ratio of Si to dopant in the inner core region is between $1:10^{-4}$ and 1:10.

18. An optical fibre according to claim 16, wherein the dopant is an element selected from Er, Nd, Pr, Ho, Yb and Tm.

19. An optical fibre according to claim 18, wherein the concentration of the dopant is between 0.001 and 10% based on the inner core region.

20. An optical fibre according to claim 19, wherein the concentration is between 0.1 and 10% by weight.

21. An optical fibre according to claim 15, wherein the dopant is a rare earth element.

*22. A method of amplifying an optical signal, the method comprising:*

*launching said optical signal into a core of an optical fibre, the optical fibre being single mode at a wavelength of the optical signal, said core having a doped region consisting essentially of silica, alumina and a fluorescent additive, the fluorescent additive being erbium;*

*simultaneously launching pump radiation into said core whereby photons of said pump radiation are absorbed by said fluorescent additive to produce a population inversion which sustains stimulated emission of signal photons so as to amplify said optical signal.*

*23. A method of amplifying an optical signal, the method comprising:*

*launching said optical signal into a core of an optical fibre, the optical fibre being single mode at a wavelength of the optical signal, said core consisting essentially of silica, alumina, germania, and a fluorescent additive, the fluorescent additive being erbium;*

*simultaneously launching pump radiation into said core whereby photons of said pump radiation are absorbed by said fluorescent additive to produce a population inversion which sustains stimulated emission of signal photons so as to amplify said optical signal.*

*24. An optical amplifier adapted for the amplification of an optical signal, said amplifier comprising:*

*a fibre having a core, the fibre being single mode at a wavelength of the optical signal, said core having a doped region consisting essentially of silica, alumina and a fluorescent additive, the fluorescent additive being erbium;*

*an input connected to the fibre, said input being adapted for launching an optical signal into the fibre for amplification;*

*a pump optically connected to said fibre for providing pump radiation into said core, said pump radiation being adapted to interact with the fluorescent additive so as to produce a population inversion capable of sustaining stimulated emission of signal photons, said stimulated emission constituting amplification of said optical signal.*

*25. An optical amplifier adapted for the amplification of an optical signal, said amplifier comprising:*

*a fibre having a core, the fibre being single mode at a wavelength of the optical signal, said core consisting essentially of silica, alumina, germania, and a fluorescent additive, the fluorescent additive being erbium;*

*an input connected to the fibre, said input being adapted for launching an optical signal into the fibre for amplification;*

*a pump optically connected to said fibre for providing pump radiation into said core, said pump radiation being adapted to interact with the fluorescent additive so as to produce a population inversion capable of sustaining stimulated emission of signal photons, said stimulated emission constituting amplification of said optical signal.*

* * * * *